Aug. 11, 1970
J. H. LANCOR, JR
3,523,724
MOTION PICTURE PROJECTOR
Filed May 18, 1967
3 Sheets-Sheet 1
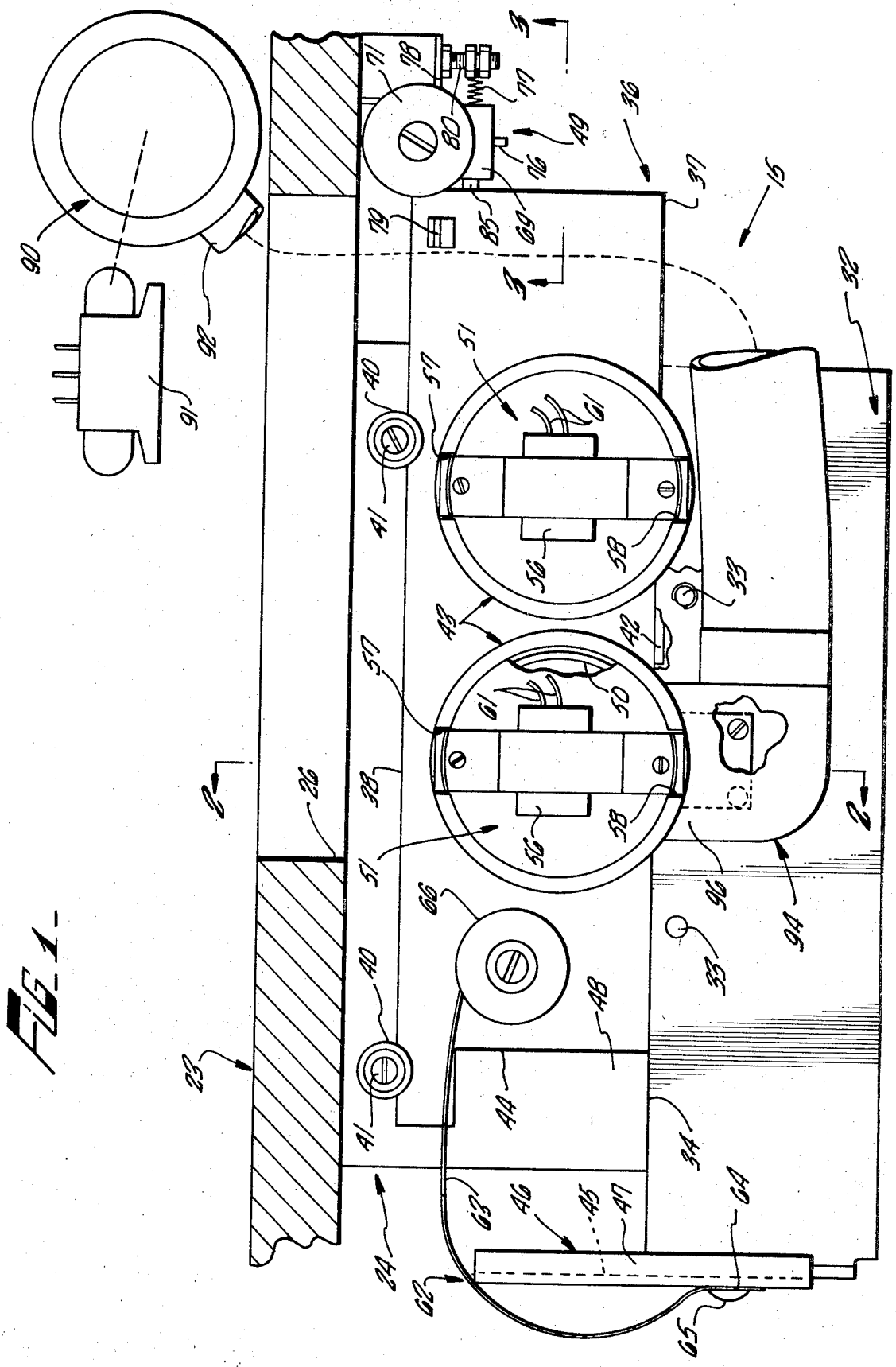

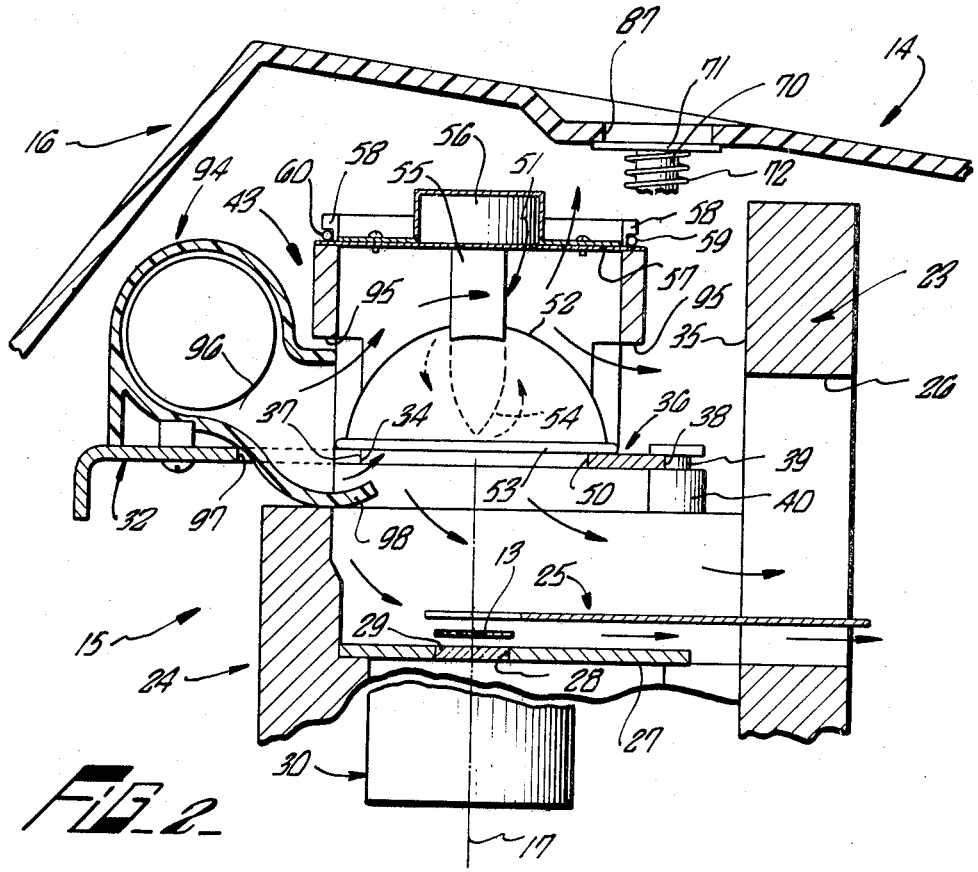
FIG_2_
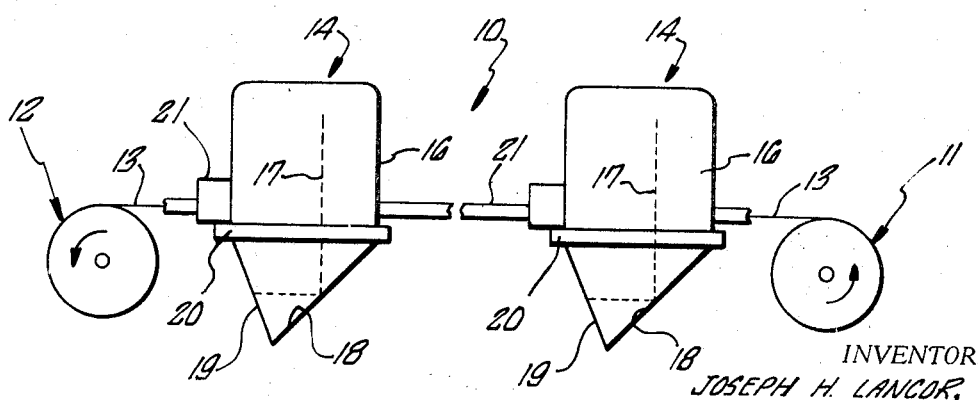
FIG_5_

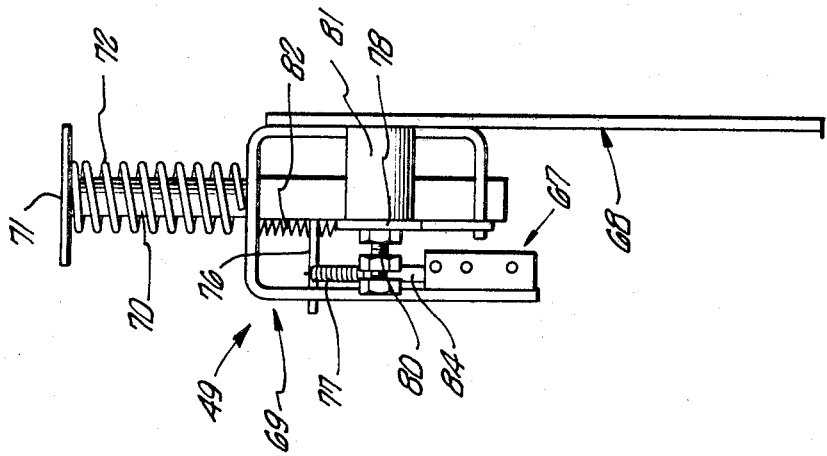
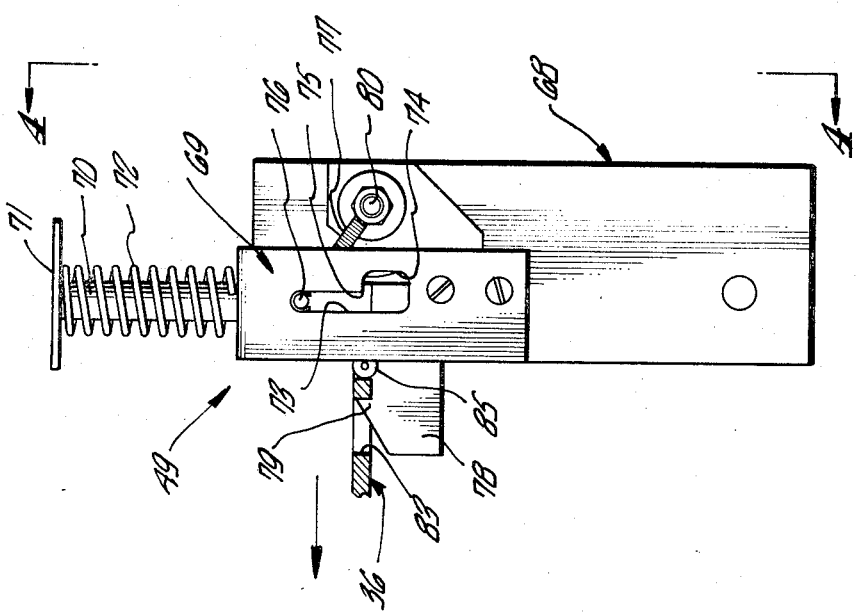

3,523,724
MOTION PICTURE PROJECTOR
Joseph H. Lancor, Jr., Arcadia, and Holland H. Freeman, Sierra Madre, Calif., assignors, by mesne assignments, to Bell & Howell Company, Chicago, Ill., a corporation of Illinois
Filed May 18, 1967, Ser. No. 639,462
Int. Cl. G03b 21/20
U.S. Cl. 352—202    10 Claims

ABSTRACT OF THE DISCLOSURE

Spare projection lamp provision in a motion picture projector, the spare lamp being mounted to be disposed in alignment with the projector optical axis by a spring device upon operation of a push button latch mechanism which also functions to signal that the principal lamp requires replacement. Also, a forced draft system for cooling the operative projection lamp and the film to low temperature levels is described. These innovations are described in the illustrative context of a multi-projection station, single film strip entertainment system for commercial passenger aircraft.

CROSS-REFERENCE TO RELATED APPLICATION

The present invention is described with reference to the motion picture display system set forth in copending commonly-owned application Ser. No. 485,768 filed Sept. 8, 1965 now Pat. No. 3,379,488 issued Apr. 23, 1968, with which the present invention has its presently preferred utility.

BACKGROUND OF THE INVENTION

Field of the invention

This invention relates to motion picture projectors in which a spare projection lamp is provided in combination with a mechanism for effectively placing the spare lamp in effective operative alignment with the projector optical axis upon failure of the principal lamp.

Problem presented in the prior art

Projection lamp failure has long been a problem in motion picture projectors. The problem is particularly troublesome in motion picture display systems in accord with copending, commonly-owned application Ser. No. 485,768 filed Sept. 8, 1965. In such systems, a single length of motion picture film is passed serially through a number of spaced projection stations, each of which has its own viewing screen for its own audience unit, disposed between a film supply station and a film take-up station. Once operation of the system is commenced, the film moves continuously through the system and is not stopped if one of the projection lamps should fail; the result is that the audience unit associated with the failed lamp is effectively removed from the system until the failed lamp can be replaced, and the audience unit is deprived of the filmed information which passes through its projection station during the period between lamp failure and lamp replacement. The problem of lamp failure can be eliminated with about 95% effectiveness if all of the lamps in the system are replaced when they have been used for about one-half their rated life. The defect in this solution to the problem is that there may be many projection stations in the system (especially where the system is installed in the passenger cabin of a commercial airliner and a projection station is provided for every third row of seats along each side of the cabin) and that the lamps are expensive, this solution is undesirably uneconomic. General Electric quartz-halogen projection lamps or their equivalent are preferred for use in this multi-station system. Such lamps do not diminish in brightness as they approach burn-out, and thus dimming of the projected image on a given projection screen cannot be relied upon as a signal to replace the projection lamp. Moreover, in air line installations of the system, the projection stations may be located in the passenger cabin overhead baggage racks where access to the projectors themselves, for the purposes of projection lamp replacement, is limited.

SUMMARY OF THE INVENTION

This invention provides a simple, reliable, economic and efficient solution to the problem of failure of projection lamps in motion picture projectors. The invention has great usefulness in motion picture display systems according to the aforementioned copending application, and the presently preferred use of the invention is in connection with such systems.

Briefly, the invention is provided in connection with a motion picture projector through which a length of motion picture film moves along a selected film path. The film path crosses an optical axis of the projector. The projector also includes a projection lens assembly aligned along the optical axis adjacent one side of the film path. The improvement provided by this invention includes first and second projection lamps, and lamp support means mounting the lamps adjacent the other side of the film path. The lamp support means is arranged so that the first lamp normally is aligned with the optical axis for directing the light therefrom along the axis across the film path to the lens assembly. Selectively operable shift means are provided and are operable for effectively shifting the first lamp out of alignment with the optical axis and for effectively aligning the second lamp with the axis so that light from the second lamp passes along the axis across the film path to the lens assembly.

DESCRIPTION OF THE DRAWINGS

The above-mentioned and other features of the invention are set forth in the following description of the invention, which description is presented with reference to the accompanying drawings, wherein:

FIG. 1 is a top plan view of a portion of a motion picture projector incorporating the invention;

FIG. 2 is a cross-sectional elevation view taken along line 2—2 in FIG. 1;

FIG. 3 is an enlarged elevation view of the projection lamp slide plate release mechanism taken along line 3—3 in FIG. 1;

FIG. 4 is an end elevation view taken along line 4—4 in FIG. 3; and

FIG. 5 is a simplified illustration of a display system according to copending application Ser. No. 485,768 in which the invention has its presently preferred utility.

DESCRIPTION OF THE PREFERRED EMBODIMENT

Referring initially to FIG. 5, a portion of a motion picture display system 10 in accord with copending, commonly-owned application Ser. No. 485,768 filed Sept. 8, 1965, is illustrated. Preferably, the display system is installed in the passenger cabin or a commercial airliner. The system includes a film supply station 11 and a film take-up station 12 between which a length of motion picture film 13 extends along a selected path between the stations. The system also includes a plurality of projection stations 14 which are disposed at spaced locations serially along the film path between the film supply and take-up stations. Preferably, the projection stations are mounted to the overhead baggage racks in the airliner passenger cabin.

Ideally, one projection station is provided for each three rows of seats, there being one line of projection stations along one side of the central aisle of the airliner cabin and a second line of projectors along the other side of the aisle. Each projection station includes a projector 15 (see FIG. 1) mounted within a housing 16. Each projector has an optical axis 17 which extends downwardly from the projector to a mirror 18 and thence to a ground glass viewing screen 19. The viewing screen and the mirror are arranged so that the viewing screen is back-lit by light passing from the projector along the optical axis. Preferably, the mirror and the viewing screen are arranged to be retracted into a passenger service module 20 which is mounted to the underside of the baggage rack and above which the projector proper is disposed. Film 13 is fed from the supply station to the first projector, between the projection stations, and from the last projection station to the take-up station through closed film guide ducting 21.

As shown in FIGS. 1 and 2, each projector station 14 includes a vertical projector foundation plate 23 to which are mounted the elements of projector 15, including a housing 24 for a film advance mechanism (not shown) of conventional construction. The film advance mechanism moves film 13 stepwise on a frame-by-frame basis across optical axis 17. Housing 24 and mechanisms mounted therein are components of a conventional motion picture projector, such as a Bell & Howell Series 500 16 mm. motion picture projector; a Bell & Howell Model 552 projector is presently preferred. The projection lamp housing of the conventional projector is not included in projector 15. A conventional rotary shutter plate 25 is located adjacent housing 24 and extends through an aperture 26 provided in the foundation plate to a mechanism (not shown) which rotates the shutter plate about an axis parallel to the portion of the optical axis shown in FIG. 2, such rotation being had in synchronism with operation of the film advance mechanism. Adjacent the portion of the shutter plate which extends across optical axis 17, housing 24 mounts an aperture plate 27 in which is formed a shutter aperture 28 centered along optical axis 17. A protective window 29 is mounted in the shutter aperture. Film 13 passes between the shutter aperture and the shutter plate across optical axis 17, as shown in FIG. 2. A projection lens assembly 30 is mounted to housing 24 for directing light passed through the film and window 29 to mirror 18 and viewing screen 19.

In lieu of the projector lamp housing which is normally mounted to housing 24 in the conventional motion picture projector, a fixed plate 32 is mounted to housing 24 at that portion of the housing which lies adjacent the side of film 13 which is opposite from shutter aperture 28. A pair of stand-off posts 33 are provided for mounting the fixed plate in spaced relation to housing 24 so that the basically planar fixed plate is arranged parallel to the shutter plane of the projector and normal to optical axis 17. Preferably, the stand-off posts are screwed into those tapped holes in housing 24 which are provided for the purposes of mounting the conventional projection lamp housing to housing 24. The fixed plate has a straight side edge 34 which lies parallel to the path of film 13 as the film crosses the optical axis; this edge is also parallel to the adjacent face 35 of the foundation plate from which the fixed plate is spaced.

A slide plate 36, having a straight side edge 37 is mounted in the plane of the fixed plate adjacent to the fixed plate between the fixed plate and foundation plate 23. Edge 37 of the slide plate is slidably abutted against fixed plate edge 34. The slide plate also has a straight opposite edge 38 which is engaged in circumferential grooves 39 in each of a pair of slide plate mounting posts 40 which are secured to housing 24 adjacent face 35 of the foundation plate, the grooves being located in the plane of fixed plate 32. Preferably, posts 40 are mounted by coaxial screws 41 in holes tapped in housing 24 for mounting the deleted conventional projection lamp housing to film advance mechanism housing 24. At about the midlength of the slide plate, a lug 42 (see FIG. 1) is mounted to the underside of the slide plate adjacent the fixed plate for engaging the underside of the fixed plate just adjacent to fixed plate edge 34. This lug serves, in cooperation with a pair of hollow, cylindrical projection lamp housings 43, to mount the slide plate to the fixed plate in the plane of the fixed plate. As shown in FIG. 1, the projection lamp housings are mounted to the upper side of the slide plate and extend toward the fixed plate beyond slide plate edge 37. Accordingly, the portion of the slide plate adjacent the fixed plate is held in the plane of the fixed plate by engagement of lug 42 and lamp housings with opposite sides of the fixed plate. Thus, the slide plate is constrained to move relative to the fixed plate only in a reciprocal manner in the plane of the fixed plate, such reciprocation being along a line transverse to optical axis 17 and parallel to the path of movement of film 13 across the optical axis.

The limits of reciprocatory motion of the slide plate are defined by engagement of an end edge 44 of the slide plate with a corresponding face 45 of a slide plate stop member 46 which extends toward foundation plate 33 from the fixed plate along a line normal to the line of reciprocation of the slide plate. The stop member is mounted at the left end of the fixed plate as the projector is viewed as shown in FIG. 1. Preferably the stop member is provided in the form of an angle extrusion having a flange 47 which stiffens the stop member. Also, it is preferred that end edge 44 of the slide plate be defined by the slide plate as a boundary of a recess 48 formed in the slide plate. The other limit of reciprocation of the slide plate relative to the fixed plate is defined by the position at which the slide plate is normally held relative to the fixed plate by a latch mechanism 49 mounted to the foundation plate adjacent the right end of the slide plate (see FIG. 1). The configuration of the slide plate preferably is as shown in FIG. 1 to maximize the distance between the guide posts 40, thereby to reduce to the smallest extent possible any tendency of the slide plate to cock or bind within its guides.

A pair of adjacent circular apertures 50, only one of which is shown in FIG. 2, are formed through the slide plate concentric to the axes of the cylindrical annular projection lamp housings 43. The apertures are located equidistantly from slide plate edge 37 a distance slightly less than the radius of the apertures. The diameter of each aperture is smaller than the inner diameter of the adjacent projection lamp housing.

Within each projection lamp housing is disposed a projection lamp 51 having a hemispherical reflector bowl 52. Preferably, each projection lamp is a 200-watt, 24 volt General Electric EJL quartz-halogen lamp. The maximum diameter of the reflector bowl is defined by a peripheral rib 53 at the maximum diameter of the bowl and is only slightly less than the inner diameter of the lamp housing. The reflector bowl is supported in an inverted position on the upper side of the slide plate concentric to the adjacent aperture 50 by engagement of the rim of the bowl with the slide place peripherally of the aperture (see FIG. 2). A fused quartz filament envelope 54 is located within reflector bowl 52, as shown in dotted lines in FIG. 2, and is connected to a neck 55 of the lamp which extends upwardly away from the slide plate along the axis of the lamp housing, also as shown in FIG. 2. Lamp terminals extending from each lamp neck are connected to a suitable connector 56 carried on a bridge plate 57 which spans the diametral extent of each lamp housing and which is supported in the housing within notches 58 formed at diametrically opposed locations at the upper end of each lamp housing. A circumferential groove 59 is formed in the outer surface of each lamp housing adjacent its upper end and receives a retainer ring 60 which serves to secure the bridge plate in place in the lamp housing.

The lamp housings are arranged on slide plate 36 so that, when the slide plate is at one limit of its path of reciprocal movement relative to the fixed plate, one of the projection lamps (the left lamp) is centered on and aligned with optical axis 17 on the side of film 13 opposite from the lens assembly. When the slide plate is at its other limit of travel relative to the fixed plate, the other projection lamp (the right lamp) is centered on the aligned with the optical axis. The normal position of the slide plate, as viewed in FIG. 1, is to the right relative to fixed plate 32 so that the left projection lamp is aligned with optical axis 17. Accordingly, the left projection lamp may be referred to as a "principal" projection lamp. The other lamp may be referred to as a "spare" projection lamp.

Each projection lamp connector 56 has two conductors 61 connected thereto the conductors from the left projection lamp being coupled into a lamp energization circuit (not shown) through a pair of normally open contacts of a switch 67 (see FIG. 4) associated with latch mechanism 49. The conductors of the other lamp connector are applied to respective normally closed contacts of the same switch. When the slide plate is in its normal, i.e., right-hand position as illustrated in FIG. 1, switch 67 is in its actuated condition and, thus, the principal projection lamp is coupled to the lamp energization circuit and the spare projection lamp is disconnected from the lamp energization circuit.

Latch mechanism 49 is a component of selectively operable shift means which operate to effectively shift the principal projection lamp out of alignment with the optical axis and to effectively align the spare projection lamp with the optical axis. Another component of this selectivity operable mechanism is a "Negator" spring mechanism 62 which is coupled between the slide and fixed plates as illustrated in FIG. 1. The spring mechanism includes an elongate leaf spring element 63 which engages and extends around the cantilevered end of stop member 46 to an end 64 which is secured to the slide plate by a rivet 65. The spring element is biased to coil upon itself. The other end of spring element 63 is secured to a coiling spool 66 which is rotatably mounted to the slide plate adjacent recess 48. The spring mechanism imposes upon the slide plate a bias which urges the slide plate to move from right to left, as shown in FIG. 2. Also, the spring mechanism is arranged so as to produce a minimum cocking or binding action of the slide plate relative to its guides.

When latch mechanism 49 is operated as described below, the slide plate is released from constraint relative to the fixed plate and, under the bias provided by spring mechanism 62, moves from right to left (see FIG. 1) to align the spare projection lamp with the optical axis of the projector. Such motion of the slide plate operates switch 67 into its unactuated condition so that the principal projection lamp is disconnected from the lamp energization circuit and the spare projection lamp is simultaneously coupled to the energization circuit.

As illustrated in FIGS. 3 and 4, latch mechanism 49 includes a base plate 68 which is secured to surface 35 of the projector foundation plate. An actuating plunger guide bracket 69, having a substantially block letter P configuration as viewed in FIG. 4, is mounted to the upper end of base plate 68. An operating plunger 70 is journalled at two spaced locations in bracket 69 and carries at its upper end an actuating disc 71. A compression spring 72 is disposed circumferentially of the plunger between disc 71 and the guide bracket, as illustrated in FIGS. 3 and 4, so that the plunger is urged upwardly relative to the guide bracket. The leg of bracket 69 spaced from and arranged parallel to base plate 68 defines an elongate slot 73 arranged parallel to the length of plunger 70. A lateral slot enlargement recess 74 is formed in the bracket at the lower end of the slot (see FIG. 3), a sharp corner 75 in the wall of the slot being defined between the slot per se and this recess. A finger 76 is connected to the plunger between its journal mountings to bracket 69 and extends radially from the plunger through slot 73. A tension spring 77 is coupled between the finger and the base plate so that the finger is engaged with that side of slot 73 to which recess 74 opens. Thus, when the plunger is depressed, finger 76 moves downwardly in slot 73 until it clears corner 75, after which time the finger moves into engagement with recess 74 in response to the action upon the finger of spring 77.

At the time that finger 76 passes downwardly beyond corner 75, a latch member 78, defining an upwardly extending keeper projection 79, is moved relative to the base plate. The latch member is pivoted relative to the base plate about a pivot post 80 secured to the base plate and to which the end of spring 77 opposite from finger 76 is connected. The latch member is spaced from the base plate by a spacer sleeve 81 disposed concentric to the pivot post. A spring 82 (see FIG. 4) is engaged between guide bracket 69 and latch member 78 so that, as the latch mechanism is viewed in FIG. 3, the latch member is induced to pivot clockwise about pivot post 80.

Base plate 68 is secured to projector foundation plate 23 just to the right of the right-hand limit of travel of slide plate 36 relative to fixed plate 32. Accordingly, keeper projection 79 of latch member 78 is engaged with the right-hand limit of a latch slot 83 formed in the slide plate, such engagement defining the right limit of travel of the slide plate (see FIGS. 1 and 3). This being so, to operate the latch mechanism a person need merely depress plunger 70 by engaging disc 71 to move the plunger downwardly relative to bracket 69 sufficiently that finger 76 passes corner 75. As the finger passes the corner, finger 76 engages the latch member and the latch member is caused to move counterclockwise about pivot post 80, thereby disengaging keeper projection 79 from slide plate slot 83. Once the latch member disengages from the slide plate, spring mechanism 62 is effective upon the slide plate to cause the slide plate to move to its other limit of travel relative to the fixed plate. Such movement of the slide plate moves the principal projection lamp out of alignment with the projector optical axis and, as described above, brings the spare projector lamp into the desired alignment with the projector optical axis.

Switch 67 preferably is a microswitch which, as noted above, has a pair of normally open contacts and a pair of normally closed contacts, the normally open contacts being coupled to the connector for the principal projection lamp, the normally closed contacts being coupled to the connector for the spare projection lamp. The microswitch has a spring biased actuating mechanism which includes an actuator leaf 84 (see FIG. 4) carrying a sensing roller 85 (FIG. 3) at its end remote from the switch housing. The switch is so positioned on bracket 69 that, when the slide plate is retained at its right-hand limit of travel by the latch member, as shown in FIG. 3, sensing roller 85 is displaced from its normal position by the extreme right-hand end of the slide plate sufficiently to actuate the switch. As the slide plate moves away from the latch assembly, the switch sensing roller follows this movement to a limited extent and causes the switch to operate from its actuated condition to its unactuated condition. In this manner, disengagement of the principal projection lamp from the lamp energization circuit and connection of the spare projection lamp to the energization circuit is accomplished automatically at the time the slide plate is caused to cycle the spare projection lamp into position along the projector optical axis.

As illustrated in FIG. 2, projector foundation plate 23, and all the above-described mechanisms connected to it and associated with the foundation plate, normally is enclosed within a projection station housing 16. An access aperture 87 is formed through the projection station housing at a location disposed along the axis of latch mechanism plunger 70. In the normal unoperated condition of the latch mechanism, plunger disc 71 abuts the underside of the housing adjacent aperture 87.

In the event that the principal projection lamp at any projection station in system 10 should burn out or otherwise fail, it is only necessary for the system operator to walk to that projection station and to operate latch mechanism 49 through aperture 87, as a result, the projection station is placed back "on line" in system 10 after only a brief interruption of the program being presented to the audience unit associated with that projection station.

Because spring 77 is effective on finger 76 to prevent the finger from passing upwardly beyond corner 75 of slot 73 unless plunger 70 is rotated in a direction sufficient to cause spring 77 to extend, the plunger normally stays downwardly relative to housing 16 once the latch mechanism has been operated. Therefore, the projection station in which the spare lamp has been cycled into position with the projector optical axis can be located quite readily by a service attendant merely feeling the several projection stations. When he locates a projection station in which he cannot feel disc 71 adjacent the aperture, he is informed that the principal projection lamp of that projection station requires replacement. The lamp replacement procedure can then be carried out as necessary and the lamp shift mechanism returned to its normal position, illustrated in FIG. 1.

The structure described above provides that all of the principal projection lamps in system 10 can be used for their full useful life. Accordingly, in view of the substantial number of projection stations involved in such systems, substantial savings result to the aircraft owner. It is not necessary for the owner of the aircraft to replace all lamps in the system at a time corresponding to one-half the rated life of the lamps, as would be the case if it were desired to assure 95% reliability of the system and the above-described structure were not provided at each projection station.

In addition to several projection stations 14, system 10 (illustrated in a simplified form in FIG. 5) includes numerous auxiliary film handling devices. As a given length of film passes through the system, film is bent and flexed many times as it passes through the several projectors and other film handling devices. As the film is flexed, it is inherently weakened. If each of the projectors throughout system 10 were of conventional construction except to the extent already noted, the film would be heated undesirably by the projection lamp each time it crossed an optical axis in a projection station. As the film is heated and cooled, it becomes brittle. Thus, unless some provision is made for cooling the film as it passes through each projection station, the useful life of the film will be drastically curtailed.

The structure illustrated in the accompanying figures includes an improved system for cooling film 13 as it traverses optical axis 17 of each projection station 14. This cooling system also effects necessary cooling of the several projection lamps in the system, and the nature of the presently preferred projection lamps utilized in the system also contributes to a minimization of the amount of heat to which the film is exposed as it passes through each projection station.

It was noted above that in the presently preferred embodiment of the invention, projection lamps 51 are General Electric EJL quartz-halogen lamps. The reflector bowls for the lamps are fabricated of hard glass. The concave front surfaces of the reflector bowls are coated with a cold dichroic reflector material. A cold dichroic reflector material reflects light in the visible spectrum, but passes electromagnetic radiation having a wavelength of 8,000 angstrom units and longer. Thus, a substantial portion of the heat radiating from filament envelope 54 passes through reflector bowl 52 and is not reflected by the reflector bowl to film 13. Only that infrared radiation which passes directly from the filament envelope to the film is available for heating the film. Still, this amount of infrared radiation is substantial and film cooling must be used to protect the film from undesired embrittlement.

As illustrated in FIG. 1, a squirrel cage air blower 90 is disposed adjacent the rear face of projector foundation plate 23 and is driven by a motor 91. An air transfer duct 92 is coupled to the outlet of the blower and extends through aperture 26 in the foundation plate to an outlet fixture 94 secured to fixed plate 32 at a location on the fixed plate which lies along a line passing through the optical axis of the projector and oriented normal to the direction of reciprocal movement of slide plate 36. As shown best in FIG. 2, each projection lamp housing 43 is provided with a pair of ports 95 arranged in the housing adjacent slide plate 36 at opposed locations along the diameter of the housing normal to the direction of slide plate movement. Fixture 94 has a lateral outlet mouth 96 which extends sufficiently toward fixed plate edge 34 that, when the slide plate is at either of its two limits of travel, the outlet mouth mates with that port 95 of the adjacent lamp housing disposed toward the fixed plate. Mouth 96 is positioned over and extends through a slot 97 formed in the fixed plate laterally of optical axis 17. The mouth extends to just short of the peripheral rim 53 provided at the maximum diameter of lamp reflector bowl 52, and has a projecting lower lip 98 which extends under the fixed plate beyond edge 34 as shown in FIG. 2. The opening of the mouth extends from above lamp lip 53 to projection 98. Accordingly, cooling air introduced into the fixture through duct 92 is discharged from the fixture partially across the back of the lamp reflector bowl and partially across the bowl opening between the projector lamp and film 13. The major portion of the air emerging from the fixture passes across the back of the projector lamp since the majority of the infrared radiation emitted from filament envelope 54 passes through the reflector bowl. This air swirls around the back of the reflector bowl within the lamp housing as illustrated by the air flow arrows in FIG. 2. The remaining air discharged from the fixture swirls into the concave portion of the reflector bowl around the filament envelope. Some of this air, because of the configuration of the structure provided, swirls downwardly across aperture plate 27 past film 13 for cooling the film.

The rotary motion of shutter plate 25 aids in the circulation of cooling air across the film and, in effect, because of the friction between the shutter plate and the air and because of the proximity of the plate to the film where the film crosses the projector optical axis, functions as a supplemental cooling fan.

The effectiveness of the cooling system provided by the structure shown in FIGS. 1 and 2 is so great that film 13 can comfortably be touched by hand just after passing optical axis 17. In conventional motion picture projectors, the temperature of the film at and adjacent the optical axis is too great to be touched comfortably by hand.

The structure of fixture 94 is such that it does not interfere with the lamp shift mechanism described above, that is, even though the fitting extends into close proximity with the principal projection lamp in the normal condition of slide plate 36, the fixture does not hinder movement of the spare projection lamp into line with optical axis 17.

The spare lamp mounting and shifting mechanism described above, as well as the film and projection lamp cooling system described above, are not limited in their utility to film display systems in accord with the aforementioned copending, commonly-owned application. It should be apparent to those skilled in the art to which this invention pertains that these developments can be used to advantage in any motion picture projection mechanism. The present invention has been described in the context of film display system 10 merely for the purposes of setting forth, in the most complete manner possible, the presently preferred embodiment of this invention. Accordingly, the foregoing description should not be considered as limiting the scope of this invention.

What is claimed is:

1. In a motion picture projector through which a length of motion picture film is movable along a selected path across an optical axis of the projector and including a projection lens assembly aligned along the optical axis adjacent one side of the film path, the improvement comprising first and second projection lamps, lamp support means mounting the lamps adjacent the other side of the film path in a selected fixed relation to each other, means mounting the lamp support means for movement between a first operative position in which one of the lamps is aligned with the optical axis for directing light therefrom along the optical axis across the film path to the lens assembly and a second operative position in which the other projection lamp is so aligned with the optical axis, and selectively operable means operable for effectively shifting the lamp support means from its first position to its second position and including means biasing the lamp support means from its first position to its second position, and latch means engageable with the lamp support means for holding the lamp support means in its first position against the action of the biasing means, the latch means including an actuating member movable between an unactuated position and an actuated position for releasing the lamp support means from constraint against the biasing means, and means responsive to movement of the actuating member from said unactuated position to said actuated position for maintaining said actuating member in its actuated position when the lamp support means is in its second operative position.

2. In a motion picture projector through which a length of motion picture film is movable along a selected path across an optical axis of the projector and including a projection lens assembly aligned along the optical axis adjacent one side of the film path, the improvement comprising first and second projection lamps, a housing for each lamp, lamp support means mounting the lamps and the housings in a selected fixed relation to each other adjacent the other side of the film path, means mounting the lamp support means for movement between a first position in which one of the lamps is aligned with the optical axis for directing light therefrom along the optical axis across the film path to the lens assembly and a second position in which the other projection lamp is so aligned with the optical axis, a source of lamp energization power, selectively operable means for effectively shifting the lamp support means from its first position to its second position an air blower, an air outlet fitting fixed adjacent the optical axis for directing air applied thereto across and around the one of the lamps aligned with the optical axis and across film disposed across the optical axis, and air duct means connected between the blower and the fitting, each lamp housing defining a port therethrough for cooperation with said fitting.

3. Apparatus according to claim 2 wherein the lamp support means includes a slide plate mounted for reciprocation along a line parallel to the film path across the optical axis, the lamps and the housing therefor being mounted to the slide plate, the fitting being fixed adjacent the slide plate and the slide plate being spaced along the optical axis from the film path.

4. In a motion picture projector through which a length of motion picture film is movable along a selected path across a projector optical axis, the combination of a pair of projection lamps each equipped with a housing, means mounting the lamps and the housings for movement relative to the optical axis from a first position in which a first one of the lamps is aligned with the optical axis and a second position in which the second lamp is aligned with the optical axis, the projector defining a cavity between the film path and the location of the lamp aligned with the optical axis, an air blower, and an air outlet fitting coupled to the blower for discharging air supplied thereto by the blower and disposed adjacent the optical axis, an opening in each lamp housing, the fitting defining an outlet opening, the fitting opening and the housing openings being cooperatively arranged so that air discharged from the fitting opening flows through the opening of the housing associated with the lamp aligned with the optical axis to pass around the lamp, through the cavity and across the film path.

5. Apparatus according to claim 4 wherein each lamp includes a reflector bowl having front and back surfaces, the fitting outlet opening is arranged to communicate to the front and back bowl surfaces of the lamp disposed thereadjacent, and the fitting includes deflector means effective upon air moving through the fitting to cause a portion of said air to move into the bowl.

6. Apparatus according to claim 5 wherein each lamp reflector bowl is transparent and the front surface thereof has a cold dichroic reflective coating applied thereto.

7. In a motion picture projector including a projection lens assembly aligned along an optical axis, the improvement comprising first and second projection lamps, lamp support means including an energization receptacle for each lamp mounting the lamps in fixed relation to each other and on a single support element disposed for movement along only a single predetermined liner path relative to the projector between a first position in which the first lamp is aligned with the optical axis for illumination of the lens assembly and a second position in which the second lamp is so aligned with the optical axis, stored energy means for providing all energy required to move the lamp support means from the first to the second position thereof and arranged for energization upon movement of the lamp support means from the second to the first position thereof, and selectively operable means for releasing energy stored in the stored energy means to move the lamp support means from its first to its second position.

8. Apparatus according to claim 7 wherein the selectively operable means includes means for indicating when the lamp support means is disposed in its second position.

9. In a motion picture projector including a projection lens assembly aligned along an optical axis, the improvement comprising first and second projection lamps, lamp support means including an energization receptacle for each lamp and conductor means connected to each receptacle, each receptacle mounting the lamps in fixed relation to each other on a single support element and disposed for movement with only a single degree of freedom relative to the projector between a first position in which the first lamp is aligned with the optical axis for illumination of the lens assembly and a second position in which the second lamp is so aligned with the optical axis, stored energy means for providing all energy required to move the lamp support means from the first to the second position thereof and arranged for energization upon movement of the lamp support means to the first position thereof, and selectively operable means for releasing energy stored in the stored energy means to move the lamp support means from its first to its second position.

10. In a motion picture projector including a projection lens assembly aligned along an optical axis, the improvement comprising first and second projection lamps, lamp energization means including an energization and support receptacle for each lamp and conductor means connected to each receptacle, each receptacle and the conductor means therefor being arranged for energization of a lamp disposed in the receptacle upon application of power to the associated conductor means, receptacle support means mounting the receptacles in fixed relation to each other and disposed for movement relative to the projector between a first position in which the first lamp is aligned with the optical axis for illumination of the lens assembly and a second position in which the second lamp is aligned with the optical axis, switch means for selecting for operative connection to a source of lamp energization power the conductor means connected to the receptacle for the lamp aligned with the optical axis, stored energy means for providing all energy required to move the receptacle support means from the first to the second position thereof and arranged for energization upon movement of the receptacle support means to the first position thereof, selectively operable means for releasing energy stored in the stored energy means to move the receptacle support means from its first to its second position, and means responsive to operation of the selectively operable means for operating the switch means.

References Cited

UNITED STATES PATENTS

| | | | |
|---|---|---|---|
| 2,798,943 | 7/1957 | Prideaux | 240—47 |
| 2,979,986 | 4/1961 | Miller | 352—202 X |
| 3,269,795 | 8/1966 | Floden | 240—37.1 X |
| 3,408,138 | 10/1968 | Harz | 352—202 |

FOREIGN PATENTS 723,035 12/1965 Canada.

NORTON ANSHER, Primary Examiner

M. H. HAYES, Assistant Examiner

U.S. Cl. X.R.

240—37.1, 47

PO-1050
(5/69)

UNITED STATES PATENT OFFICE
CERTIFICATE OF CORRECTION

Patent No. 3,523,724          Dated August 11, 1970

Inventor(s) J. H. Lancor, Jr. and Holland H. Freeman

It is certified that error appears in the above-identified patent and that said Letters Patent are hereby corrected as shown below:

Column 1, line 71, change "," to --;--;

Column 2, line 64, change "or" to --of--;

Column 3, line 26, between "and" and "mechanisms" insert --the--;

Column 4, line 61, change "place" to --plate--;

Column 5, line 10, change "the" (second occurrence) to --and--;

lines 35 and 36, change "selectivity" to --selectively--;

Column 9, line 52, after "position" (second occurrence) insert --,--;

Column 10, line 30, change "liner" to --linear--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents